(12) United States Patent  
Vaughn

(10) Patent No.: US 7,931,302 B2  
(45) Date of Patent: Apr. 26, 2011

(54) LATERALLY EXTENDIBLE MUD FLAP MOUNTING ASSEMBLY FOR VEHICLES

(76) Inventor: Joseph A. Vaughn, Orofino, ID (US)

( * ) Notice: Subject to any disclaimer, the term of this patent is extended or adjusted under 35 U.S.C. 154(b) by 347 days.

(21) Appl. No.: 12/012,445

(22) Filed: Feb. 4, 2008

(65) Prior Publication Data

US 2009/0194967 A1     Aug. 6, 2009

(51) Int. Cl.
*B62D 25/18* (2006.01)
(52) U.S. Cl. .......................... 280/851; 280/847; 280/154
(58) Field of Classification Search .......... 280/847, 280/848, 851, 152.3, 154, 155
See application file for complete search history.

(56) References Cited

U.S. PATENT DOCUMENTS

| | | | |
|---|---|---|---|
| 2,935,336 A * | 5/1960 | Case | 280/851 |
| 3,684,312 A | 8/1972 | Evans | |
| 3,837,672 A | 9/1974 | Molby | |
| 3,877,722 A | 4/1975 | Conner | |
| 3,954,281 A | 5/1976 | Juergens | |
| 4,221,432 A * | 9/1980 | VanRemortel et al. | 298/1 SG |
| 5,121,944 A | 6/1992 | Haddox | |
| 5,833,254 A | 11/1998 | Bucho | |
| 6,076,842 A * | 6/2000 | Knoer | 280/154 |
| 6,179,311 B1 | 1/2001 | Larkin et al. | |
| 6,375,223 B1 | 4/2002 | Kirckof | |
| 6,942,252 B2 * | 9/2005 | Buuck et al. | 280/847 |
| 7,407,194 B1 * | 8/2008 | Alley | 280/851 |
| 7,607,698 B2 * | 10/2009 | Cicansky | 280/851 |
| 2002/0185853 A1 * | 12/2002 | Gaudet | 280/847 |

* cited by examiner

*Primary Examiner* — Glenn Dayoan
*Assistant Examiner* — Bridget Avery
(74) *Attorney, Agent, or Firm* — William A. Jeckle

(57) ABSTRACT

A mud flap mounting assembly for vehicles providing an elongate laterally extending central support beam defining a medial channel slidably carrying similar elongate mud flap extensions extendible from each opposing end to positions laterally outward of the vehicles' rear tires. The central support beam is secured to a ball mount receiving box beam extending rearwardly from the vehicle by two medial spacedly adjacent depending fastening arms carrying two vertically spaced fasteners extending therethrough above and below the receiving box beam. A mud flap mounting arm carrying a depending mud flap is fastened to the laterally outer end portion of each mud flap extension. A collar carried at the inner end portion of each mud flap mounting arm and having a releasable fastener positionally secures and maintains the mud flap extension and mud flap mounting arm to the central support beam.

6 Claims, 5 Drawing Sheets

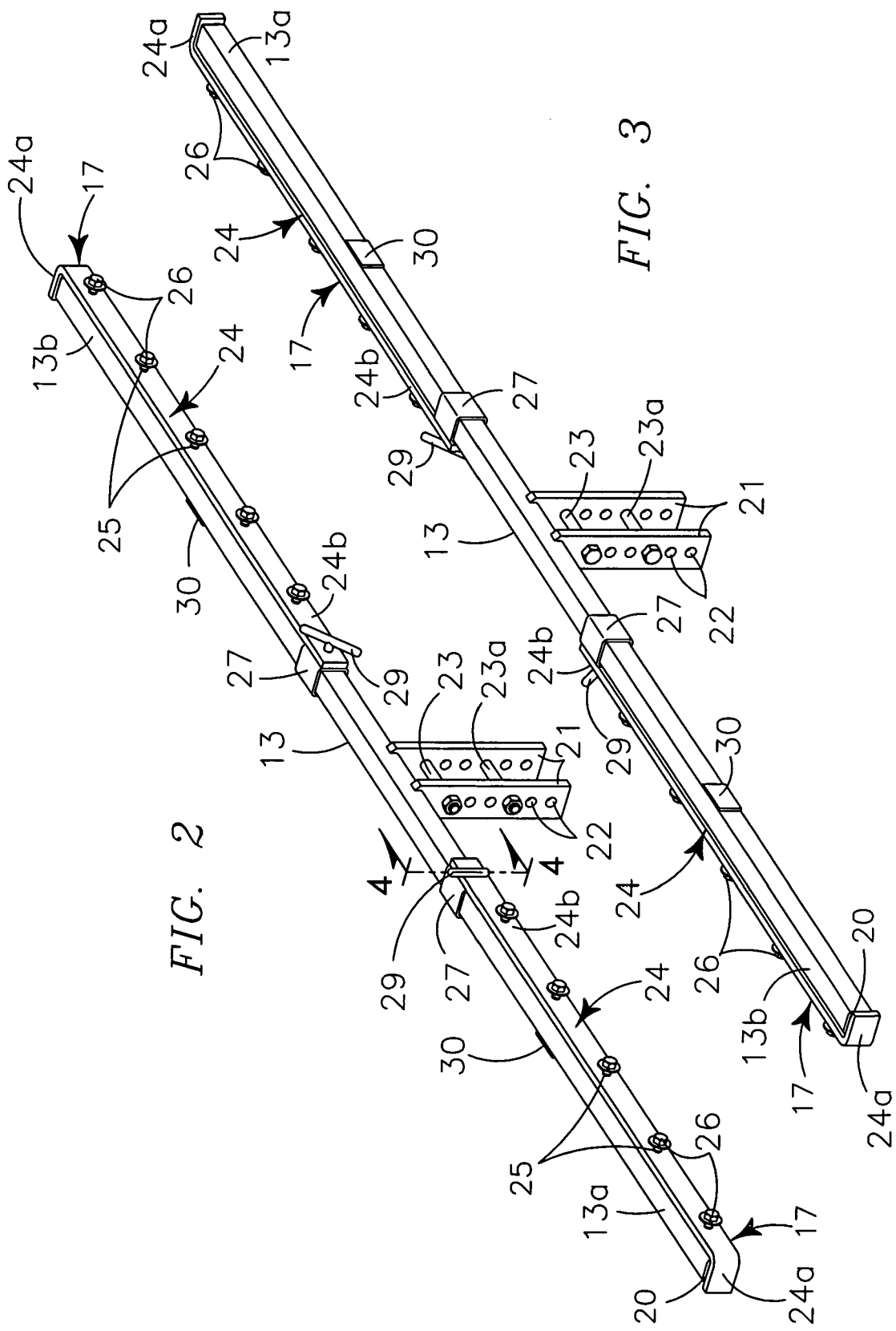

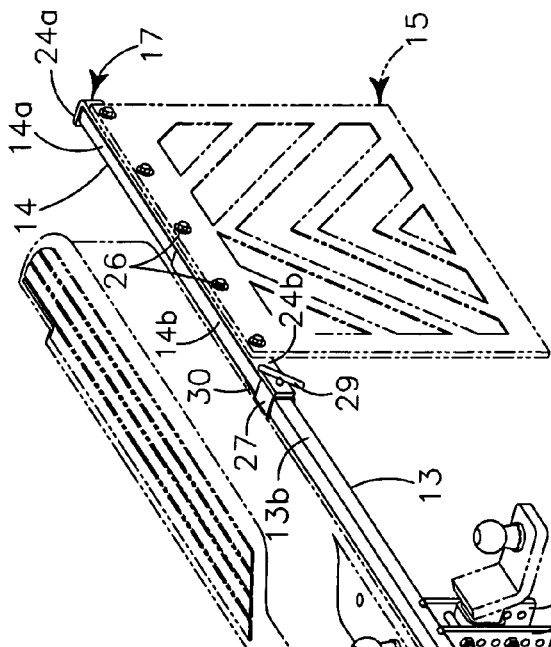
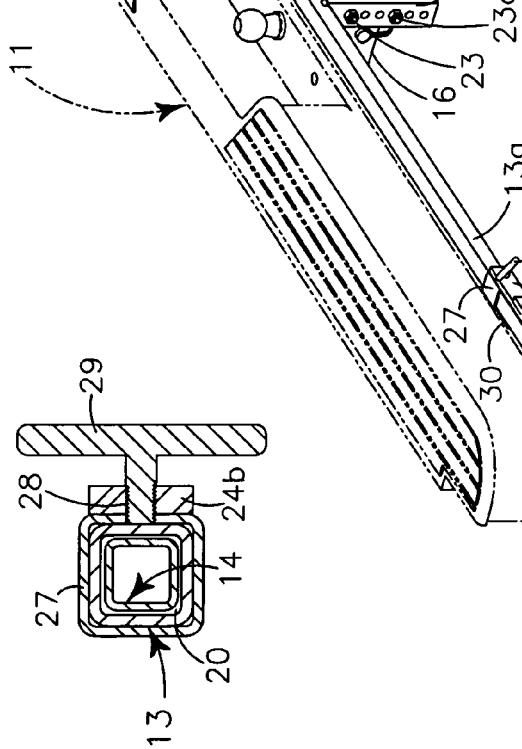
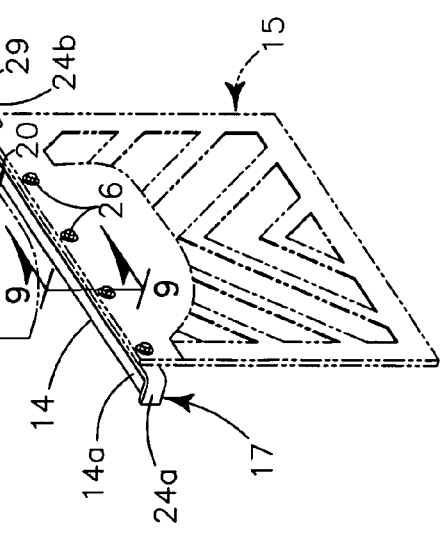
FIG. 4
FIG. 5

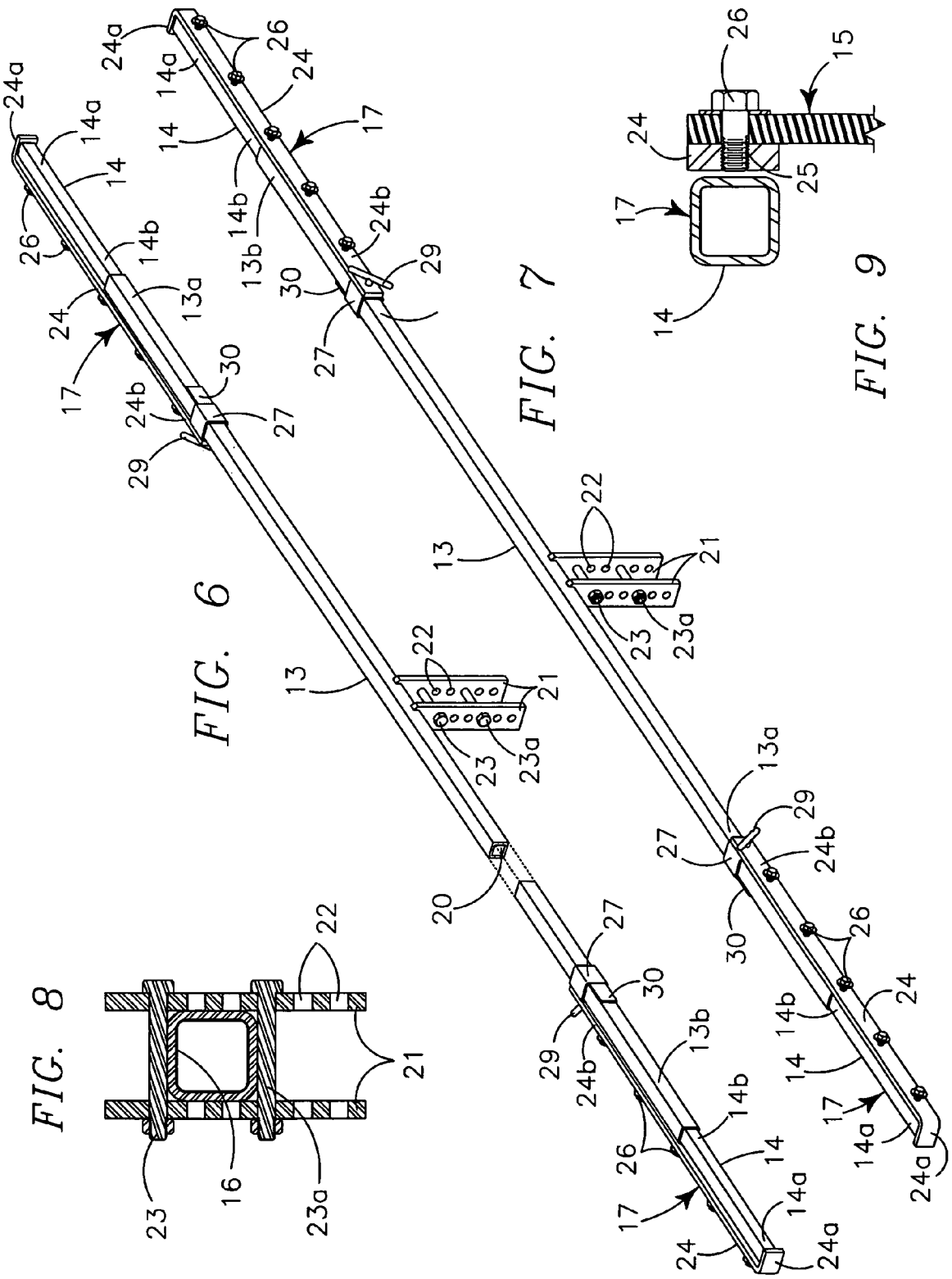

LATERALLY EXTENDIBLE MUD FLAP MOUNTING ASSEMBLY FOR VEHICLES

BACKGROUND OF INVENTION

A. Related Applications

There are no applications related hereto heretofore filed in this or in any foreign country.

B. Field of Invention

This invention relates to land vehicle carried mud and dust guards, and more particularly to a mounting assembly for such guards which allows the guards to be optionally extended laterally outwardly of the vehicle's rear tires.

BACKGROUND AND DESCRIPTION OF PRIOR ART

Guards, commonly called mud flaps, are widely used on vehicles such as trucks to prevent rocks, mud and road debris from being thrown rearwardly by the vehicle's rear tires. For some vehicles such as commercial trucks, various laws and regulations require mud flaps. Various methods of mounting mud flaps to vehicles are known in the prior art including laterally extending members fastened to the vehicle's frame that support depending mud flaps behind the rear tires, and brackets mounted to the vehicle's rear bumper to support the depending mud flaps. Other mounting methods include fastening mud flaps to the edges of the vehicle's fender wells, and brackets fastened to the vehicle's suspension components.

Traditionally, mud flaps are positioned with the laterally outer edges of the mud flaps aligned with the laterally outer surfaces of the vehicle's rear tires. However, this position is not adequate when a towed vehicle, such as a trailer carrying a boat, is wider than the towing vehicle because mud, rocks and other road debris thrown rearwardly by the towing vehicle's rear tires may pass rearwardly laterally outwardly of the mud flaps to strike the towed vehicle causing damage thereto, especially during turns. Further, the mounting means for mud flaps commonly are fixed and not adjustable so that the mounting means are not adversely affected by vibration caused by vehicle movement. Although commonly perceived to be of benefit, a fixed and not adjustable mounting means is in reality a shortcoming because the fixed mounting means prevents height adjustability of the mud flaps to compensate for vehicle loads, and prevents lateral adjustability of the mud flaps to protect towed vehicles that may be wider than the towing vehicle.

The instant invention seeks to overcome various of these shortcomings of the prior art by providing a mud flap mounting assembly that is laterally extendible and height adjustable in order to position the depending mud flaps to deflect rocks, mud and other road debris thrown rearwardly by action of the vehicle tires before the material strikes and causes damage to a towed vehicle, while yet retaining structural rigidity and durability of non-extendible mud flap mounting assemblies.

My invention does not reside in any single one of the identified features individually but rather in the synergistic combination of all of its structures, which give rise to the functions necessarily flowing therefrom as hereinafter claimed.

SUMMARY OF INVENTION

My laterally extendible mud flap mounting assembly generally provides an elongate central support beam defining a medial channel therethrough and carrying at medially elongate positions thereon two spacedly adjacent fastening arms adjustably fastenable to a ball mount receiving box beam extending rearwardly from a towing vehicle. Two laterally extendible mud flap assemblies, each having a mud flap extension carrying a mud flap mounting arm with a mud flap depending therefrom are carried partially within the medial channel of the central support beam and may be extended laterally outwardly so that the laterally outer edge of the mud flap is laterally outward of the laterally outer surfaces of the towing vehicle's rear tires. A collar at an inner end portion of each mud flap mounting arm carries a releasable bolt type fastener to positionally secure the laterally extendible mud flap assembly to the central support beam.

In providing such an apparatus it is:

A principal object to provide a mud flap mounting assembly that is both laterally extendible and height adjustable.

A further object is to provide a mud flap mounting assembly wherein the mud flaps may be optionally extended laterally outwardly beyond the lateral outer surfaces of the towing vehicle's rear tires.

A further object is to provide a mud flap mounting assembly wherein the position of the lower edges of the mud flaps above the ground may be adjusted responsive to the vehicle load and weight of the towed vehicle.

A further object is to provide a mud flap mounting assembly wherein the mud flaps may be retracted to a position where the laterally outer edges of the mud flaps are aligned with the laterally outer surfaces of the towing vehicle's rear tires.

A still further object is to provide a mud flap mounting assembly wherein the mud flaps may be extended and retracted without use of tools A still further object is to provide a mud flap mounting assembly that is of new and novel design, of a rugged and durable nature, of simple and economic manufacture and one that is otherwise well suited to the uses and purposes for which it is intended.

Other and further objects of my invention will appear from the following specification and accompanying drawings which form a part hereof. In carrying out the objects of my invention it is to be understood that its features are susceptible to change in design and structural arrangement with only one preferred and practical embodiment of the best known mode being illustrated in the accompanying drawings and specified as is required.

BRIEF DESCRIPTIONS OF DRAWINGS

In the accompanying drawings which form a part hereof and wherein like numbers refer to similar parts throughout:

FIG. 2 is an isometric top, rear and left side forward looking view of the mud flap mounting assembly in a retracted position with mud flaps removed.

FIG. 3 is an isometric top, front and right side rearward looking view of the structure of FIG. 2.

FIG. 4 is a vertical cross sectional view through the collar and bolt type fastener of FIG. 2 taken on the Line 4-4 on FIG. 2 in the direction indicated by the arrows.

FIG. 5 is an isometric top, rear and left side forward looking view of the structures of FIG. 1 showing the mud flap assemblies in an extended position.

FIG. 6 is a view similar to that of FIG. 3 but showing the mud flap assemblies in an extended position.

FIG. 7 is a view similar to that of FIG. 2 but showing the mud flap assemblies in an extended position.

FIG. 8 is a vertical cross sectional view through the fastening arms and receiving box beam of FIG. 1, taken on Line 8-8 thereon in the direction indicated by the arrows.

FIG. 9 is a vertical cross sectional view through the mud flap mounting arm of FIG. 5, taken on Line 9-9 thereon in the direction indicated by the arrows.

DESCRIPTION OF PREFERRED EMBODIMENT

Figure 1:
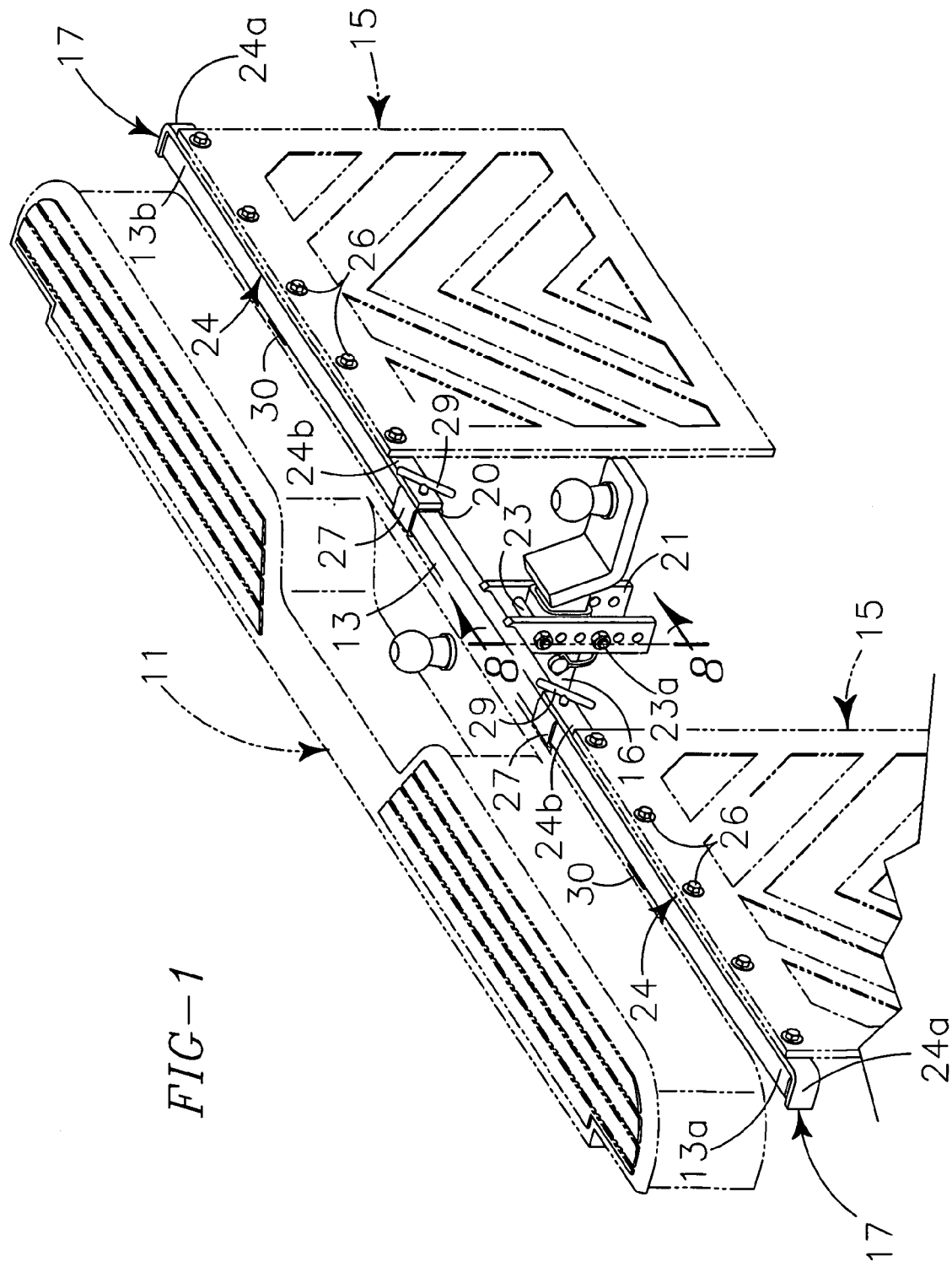
FIG. 1 is a partial isometric top, rear and left side forward looking view of the mud flap mounting assembly fastened to a ball mount receiving box beam extending rearwardly from a vehicle showing the mud flap assembly in a retracted position.

My laterally extendible mud flap mounting assembly for vehicles generally provides a central support beam 13 slidably carrying at each opposed end portion 13a,13b a laterally extendible mud flap assembly 17, each mud flap assembly 17 having a mud flap extension 14 carrying a mud flap mounting arm 24 with a mud flap 15 depending therefrom.

As shown in FIGS. 2 and 3 the central support beam 13 is an elongate box beam having opposed end portions and defining medial channel 20 (FIG. 4) extending therethrough. Two parallel spacedly adjacent fastening arms 21 are structurally carried by the central support beam 13 to depend therefrom at medial positions thereon. A plurality of opposed cooperating pairs of vertically spaced holes 22 are defined in both fastening arms 21 to carry releasable nut and bolt type fasteners 23,23a therein to extend therethrough. As shown in FIGS. 1 and 5, the fastening arms 21 are secured outwardly adjacent each side of a receiving box beam 16 extending rearwardly from the vehicle 11 with one bolt type fastener 23 above and one nut and bolt type fastener 23a below the receiving box beam 16. The position of the nut and bolt type fasteners 23,23a in holes 22 defined in fastening arms 21 provides height adjustability for the central support beam 13 on the receiving box beam 16 which responsively adjusts the height of the mud flaps 15 in relation to the ground.

As shown in FIGS. 6 and 7, each laterally extendible mud flap assembly 17 has a mud flap extension 14 formed of an elongate box beam having an outer end portion 14a and an opposed inner end portion 14b. The inner end portion 14b of each mud flap extension 14 is slidably carried within the medial channel 20 of a central support beam 13 at each end portion thereof so that outer end portion 14a of each mud flap extension 14 may extend laterally outwardly therefrom.

An "L" shaped mud flap mounting arm 24 having an elongate inner end portion 24b and short perpendicular outer end portion 24a is structurally carried by each mud flap extension 14. Each mud flap mounting arm 24 and each mud flap extension 14 are arranged so that the inner end portions 24b and 14b respectively are generally parallel and spacedly adjacent one another, while the outer end portions 24a and 14a respectively are structurally interconnected, such as by welding. Plural horizontally spaced threaded holes 25 (FIG. 9) are defined in the mud flap mounting arm 24 to threadably engage bolt type fasteners 26 to secure a mud flap 15 to each mud flap mounting arm 24.

A collar 27 defining a channel (not shown) therethrough, sized and configured to slide over and about the central support beam 13, is structurally carried at the inner end portion 24b of each mud flap mounting arm 24. A releasable bolt type fastener 29 is carried in a threaded hole 28 (FIG. 4) defined in the collar 27 so that the collar 27, the structurally attached mud flap mounting arm 24, the mud flap extension 14 and the depending mud flap 15 may be adjustably positioned and positionally maintained along the central support beam 13.

A protruding mud flap extension stop 30 is structurally carried inwardly adjacent each end portion of the central support beam 13 to prevent the collar 27 from passing thereover.

A mud flap 15 is releasably fastened to each mud flap mounting arm 24 by bolt type fasteners 26 extending therethrough and engaging in the threaded holes 25 so that the mud flap 15 depends from the adjacent mud flap mounting arm 24.

Having described the structure of my laterally extendible mud flap mounting assembly for vehicles, its assembly and operation may be understood.

Mud flaps 15 are secured to each mud flap mounting arm 24 with bolt type fasteners 26 extending through an upper edge of the mud flap 15 and engaging in horizontally spaced threaded holes 25 defined in mud flap mounting arm 24. Elongate central support beam 13 is positioned so that the depending fastening arms 21 are outwardly adjacent each lateral side of the ball mount receiving box beam 16 extending rearwardly from the vehicle 11. Releasable nut and bolt type fasteners 23 are installed to extend horizontally through opposed pairs of vertically spaced holes 22 defined in fastening arms 21 with one nut and bolt type fastener 23 positioned immediately above the receiving box beam 16 in a position such that lower end portions of the mud flaps 15 are within approximately ½ inch of the surface supporting the serviced vehicle 11. A second similar nut and bolt type fastener 23,23a is installed through opposed pairs of holes 22 defined in fastening arms 21 adjacently below the receiving box beam 16 and the nut and bolt type fasteners 23,23a are tightened to secure the assembly to the vehicle 11 at the proper height.

The customary position for mud flaps is directly behind the vehicle's rear tires 12 with the laterally outer edges of the mud flap 15 aligned with the laterally outer surfaces of the vehicle's rear tires 12. This position is attained when the laterally extendible mud flap assemblies 17 are in the retracted position shown in FIG. 1 and the left side of FIG. 10.

Figure 10:
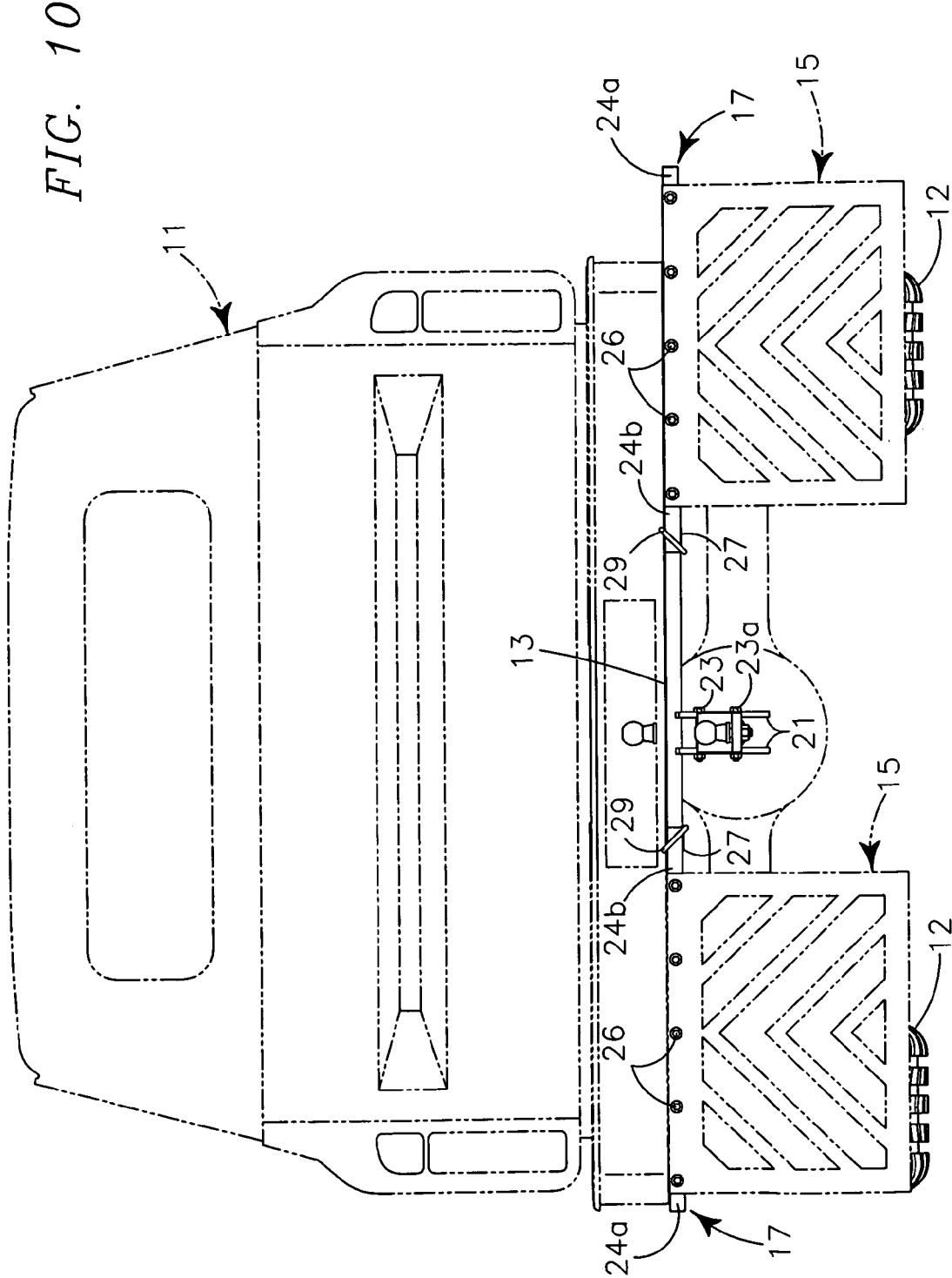
FIG. 10 is an orthographic forward looking view of the mud flap mounting assembly mounted on a vehicle with the right mud flap assembly in an extended position, and the left mud flap assembly in a retracted position.

As shown in FIG. 5 and the right side of FIG. 10, when the vehicle 11 is towing another vehicle, such as a trailer carrying a boat, the laterally extendible mud flap assemblies 17 are extended laterally outwardly so that the laterally outer edges of the mud flaps 15 are laterally outward of the laterally outer surfaces of vehicle's rear tires 12. The mud flap assemblies 17 are extended by loosening the bolt type fasteners 29 carried by collars 27 and thereafter sliding the collar 27, the mud flap mounting arm 24 carrying the mud flap 15 and the mud flap extension 14 laterally outwardly so that collar 27 is inwardly adjacent the extension stop 30 in the instance illustrated. The mud flap assembly 17 is then secured in the extended position by tightening the bolt type fasteners 29. While in the extended position, as shown in FIG. 5 and the right side of FIG. 10, mud, rocks and other road debris thrown rearwardly by action of the vehicle's rear tires 12 strike the mud flaps 15 rather than flying rearwardly to strike the towed vehicle or its load to cause damage to either. The laterally extendible mud flap assemblies 17 may be retracted by generally reversing the above steps.

The foregoing description of my invention is necessarily of a detailed nature so that a specific embodiment of a best mode may be set forth as is required, but it is to be understood that various modifications of details, and rearrangement, substitution and multiplication of parts may be resorted to without departing from its spirit, essence or scope.

Having thusly described my invention, what I desire to protect by Letters Patent, and

What I claim is:

1. A laterally extendible and vertically adjustable mud flap mounting assembly for a vehicle having a ball mount receiving beam extending rearwardly from the vehicle, comprising in combination:
   an elongate central support beam defining a medial channel extending between opposed lateral ends and carrying two spacedly adjacent depending fastening arms in a medial position, each fastening arm defining a plurality of opposed cooperating pairs of vertically spaced holes to carry releasable fasteners to fasten the central support beam orthogonally to the receiving beam;
   two similar mud flap assemblies each having an elongate mud flap extension slidably carried within each end of the medial channel of the central support beam to extend laterally therefrom with a mud flap mounting arm carried by each mud flap extension to extend laterally inwardly spacedly adjacent and parallel to the central support beam, and
   a collar carried by the laterally inner end portion of the mud flap mounting arms to slidably fit over and about the central support beam, and carry releasable fastening means to positionally secure the mud flap assembly relative to the central support beam.

2. The mud flap mounting assembly of claim 1 wherein the central support beam and the mud flap extensions are formed of box beams.

3. The mud flap mounting assembly of claim 1 wherein:
   each mud flap mounting arm defines plural horizontally spaced holes carrying releasable fasteners to releasably fasten a mud flap to the mud flap mounting arm.

4. The mud flap mounting assembly of claim 1 wherein the releasable fastening means of the collar comprise a threaded hole defined through the collar carrying a threaded fastener therein to frictionally engage the central support beam.

5. The mud flap mounting assembly of claim 1 further having a protruding mud flap extension stop structurally carried by the central support beam spacedly adjacent each opposing end portion thereof to limit the lateral extension of the mud flap mounting assembly relative to the central support beam.

6. A laterally extendible and vertically adjustable mud flap mounting assembly for a vehicle having a ball mount receiving box beam extending rearwardly from the vehicle, comprising in combination:
   an elongate central support box beam having opposing end portions and defining a medial channel extending therethrough, the central support box beam carrying a protruding mud flap extension stop spacedly adjacent opposing end portions and two spacedly adjacent depending fastening arms at a medial position, each fastening arms in a defining a plurality of opposed cooperating pairs of vertically spaced holes to carry releasable fasteners to fasten the central support beam orthogonally to the receiving box beam;
   two similar mud flap assemblies each having an elongate box beam mud flap extension slidably within each end of the medial channel of the central support beam to extend laterally therefrom with and a mud flap mounting arm carried by each mud flap extension to extend spacedly adjacent and parallel to the central support beam, and each mud flap mounting arm defining plural spaced holes to carry releasable fasteners extending therethrough to releasably fasten mud flaps to the mud flap mounting arms, and
   a collar carried by the laterally inner end portions of the mud flap mounting arms to slidably fit over and about the central support beam, and the collar defining a threaded hole extending therethrough to carry a threaded fastener therein to frictionally engage the central support beam to positionally maintain the mud flap assembly relative to the central support beam.

\* \* \* \* \*